(12) United States Patent
Neudorf et al.

(10) Patent No.: US 9,949,443 B2
(45) Date of Patent: Apr. 24, 2018

(54) BALE PROCESSOR WITH FAN AND SIDE DISCHARGES

(71) Applicant: Highline Manufacturing Ltd., Vonda (CA)

(72) Inventors: Blake Neudorf, Vonda (CA); Montgomerie Summach, St. Brieux (CA)

(73) Assignee: Highline Manufacturing Ltd., Vonda (CA)

( * ) Notice: Subject to any disclaimer, the term of this patent is extended or adjusted under 35 U.S.C. 154(b) by 737 days.

(21) Appl. No.: 14/284,469

(22) Filed: May 22, 2014

(65) Prior Publication Data

US 2015/0102146 A1   Apr. 16, 2015

(30) Foreign Application Priority Data

Oct. 11, 2013  (CA) ..................................... 2829893

(51) Int. Cl.
*A01F 29/00*  (2006.01)
*A01F 29/12*  (2006.01)

(52) U.S. Cl.
CPC ............ *A01F 29/12* (2013.01); *A01F 29/005* (2013.01)

(58) Field of Classification Search
CPC ............................... A01F 29/12; A01F 29/005
USPC .......................... 241/605, 101.76, 60, 186.5
See application file for complete search history.

(56) References Cited

U.S. PATENT DOCUMENTS

| | | | | |
|---|---|---|---|---|
| 3,032,219 A | * | 5/1962 | Martens | A01C 3/066 239/663 |
| 4,311,282 A | * | 1/1982 | Howell | B02C 13/286 241/101.8 |
| 4,524,916 A | * | 6/1985 | Keyes | A01D 87/127 241/101.76 |
| 4,896,970 A | * | 1/1990 | Schuler | A01K 5/002 198/672 |
| 5,033,683 A | | 7/1991 | Taylor | |
| 5,340,040 A | | 8/1994 | Bussiere et al. | |
| 5,601,241 A | * | 2/1997 | Brewster | A01F 29/005 241/101.76 |
| 5,803,375 A | * | 9/1998 | Hartwig | A01F 29/005 241/101.761 |
| 5,813,616 A | * | 9/1998 | Vandervalk | A01F 29/005 241/101.76 |

(Continued)

*Primary Examiner* — Faye Francis
(74) *Attorney, Agent, or Firm* — Michael A. Bondi; Moss & Barnett

(57) ABSTRACT

A bale processor has a bale chamber mounted on a frame and a disintegrator shreds material from a bale and discharges shredded material laterally. A fan receives the shredded material through a fan inlet and blows the material out through a fan discharge. A conveyor receives the shredded material from the disintegrator along an inner side thereof. A side opening extends along an outer side of the conveyor and a side door is movable from a closed position, where the side opening is closed and the conveyor is enclosed and moves the shredded material along the conveyor and into the fan inlet, to an open position where the outer side of the conveyor is open and the conveyor moves the shredded material laterally out through the side opening. An auger conveyor mounted only on an end opposite the fan inlet leaves the fan inlet unobstructed, increasing capacity.

9 Claims, 7 Drawing Sheets

(56) References Cited

U.S. PATENT DOCUMENTS

| | | | | |
|---|---|---|---|---|
| 5,967,433 A | * | 10/1999 | O'Neill | A01F 29/005 241/101.2 |
| 5,975,444 A | * | 11/1999 | Ethier | A01F 29/005 241/101.76 |
| 6,027,054 A | * | 2/2000 | Kaye | A01F 29/005 241/101.74 |
| 6,155,506 A | * | 12/2000 | Loppoli | A01D 90/105 241/101.76 |
| 6,719,627 B2 | * | 4/2004 | Wolters | A01F 12/40 460/111 |
| 6,863,605 B2 | * | 3/2005 | Gryspeerdt | A01F 12/40 460/111 |
| 6,881,145 B2 | * | 4/2005 | Holmen | A01D 41/1243 460/112 |
| 7,793,873 B2 | * | 9/2010 | Hoovestol | A01F 29/005 241/101.76 |
| 8,066,208 B2 | | 11/2011 | Bennett | |

\* cited by examiner

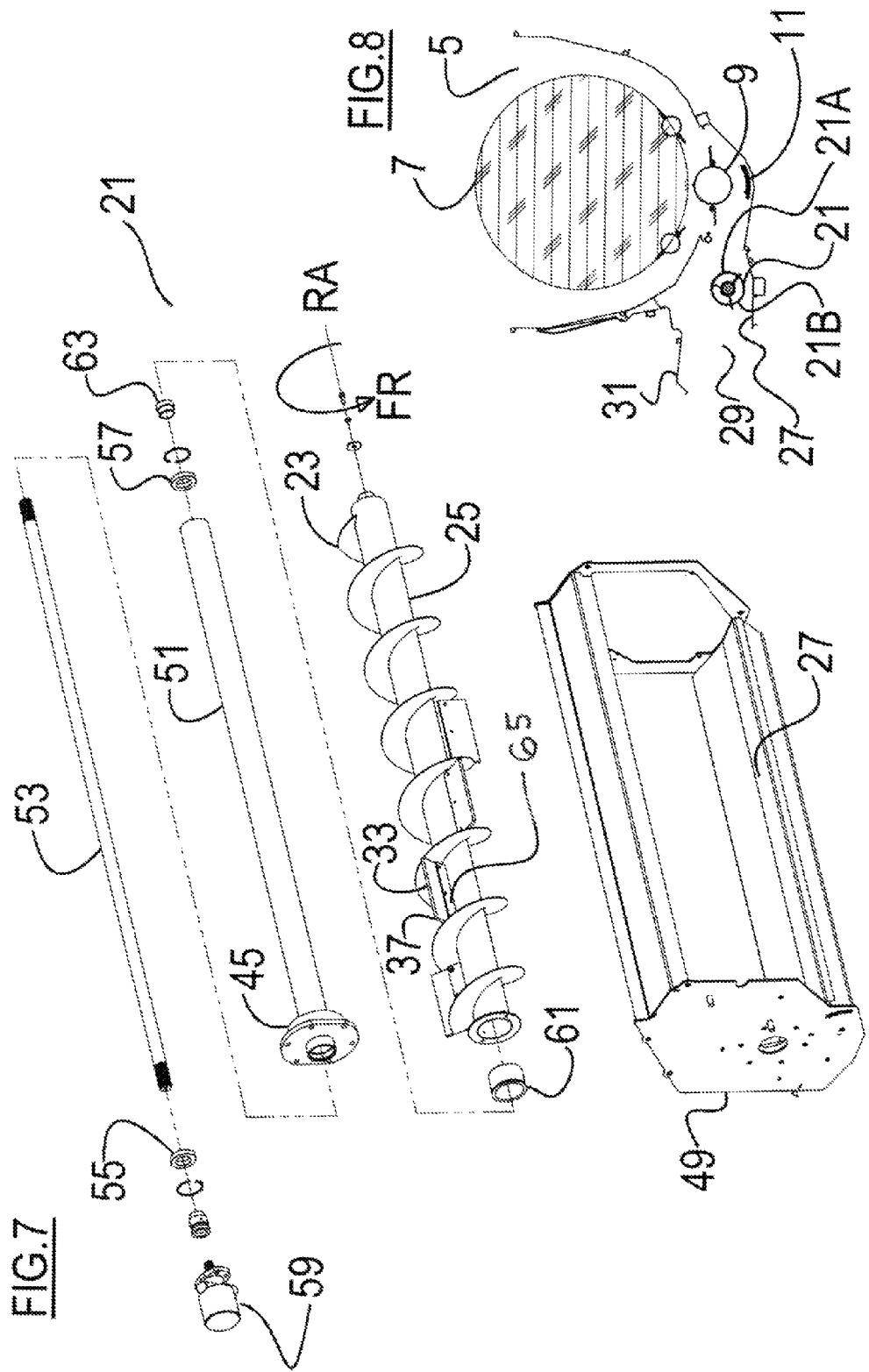

BALE PROCESSOR WITH FAN AND SIDE DISCHARGES

This disclosure relates to the field of agricultural equipment and in particular a bale processor for shredding bales and discharging shredded material through a side opening into a windrow or through a fan which spreads the material.

BACKGROUND

Crop material such as hay, straw and the like is commonly harvested by compacting the material into bales tied with twine. These bales can be small square bales that can be handled by hand, but more commonly now they are large bales that can weigh up to 2000 pounds. These large bales can be rectangular or cylindrical, and when feeding such bales it is common to use a bale processor to shred crop material from the bale with a disintegrator or flail apparatus and then and discharge the shredded material onto the ground or into a feed bunk. Such a bale processor is disclosed for example in U.S. Pat. No. 5,340,040 to Bussiere et al. and in U.S. Pat. No. 5,033,683 to Taylor.

It is sometimes desired to cover an area of ground with shredded bale material, for example as a mulch to protect freshly seeded grass, as bedding in feed lot pens, or for like purposes. U.S. Pat. No. 8,066,208 to Bennett discloses a bale processor that includes a fan for receiving shredded bale material and blowing it long distances to provide ground cover. The Bennett machine can also instead discharge shredded material laterally into windrow or feed bunk.

In the Bennett machine, an auger along one side of the bale chamber receives the shredded material and carries it forward to a chamber that has two openings, a first opening faces forward and is open to the fan, and a second faces to the side and is open to the intake of a short conveyor that carries the material laterally into a windrow or feed bunk. In operation one of the openings is closed by placing a panel in the opening, and the other is open, depending on which discharge system is being used.

SUMMARY OF THE INVENTION

The present disclosure provides a bale processor apparatus that overcomes problems in the prior art.

In a first embodiment the present disclosure provides a bale processor apparatus comprising a frame and a bale chamber mounted on the frame and configured to hold a bale. A disintegrator adjacent to the bale chamber is operative to shred material from the bale and discharge shredded material laterally. A fan is operative to receive the shredded material through a fan inlet and blow the shredded material out through a fan discharge. A conveyor extends along a side of the disintegrator and is operative to receive the shredded material from the disintegrator along an inner side of the conveyor. A side opening extends along an outer side of the conveyor and a side door covers the side opening. The side door is movable from a closed position, where the conveyor is substantially enclosed and the conveyor moves the shredded material along the conveyor and into the fan inlet, to an open position where the outer side of the conveyor is open and the conveyor moves the shredded material laterally out through the side opening.

In a second embodiment the present disclosure provides a bale processor apparatus comprising a frame and a bale chamber mounted on the frame and configured to hold a bale. A disintegrator adjacent to the bale chamber is operative to shred material from the bale and discharge shredded material laterally. A fan is operative to receive the shredded material through a fan inlet and blow the shredded material out through a fan discharge. An auger extends along a side of the disintegrator and is operative to receive the shredded material from the disintegrator along an inner side of the auger and move the shredded material into the fan inlet. The auger is rotatably attached to the frame only at a mounted end thereof opposite the fan inlet such that a discharge end of the auger at the fan inlet is suspended above the auger floor.

The present disclosure provides an auger conveyor with paddles between the flights such that, when enclosed by the side door, the shredded material moves along the auger as it would in any auger, however when the side door is opened the paddles push the shredded material laterally out the side opening to land on the ground in a windrow. The auger with paddles provides a simple and economic mechanism for converting a bale processor from discharging through a fan discharge to spread shredded material across the ground, or discharging through the side opening into a windrow. To increase capacity, the auger can be mounted on a cantilever, connected to the frame on one end only opposite the fan inlet so that the discharge end of the auger adjacent to the fan inlet floats above the auger floor keeping the fan inlet unobstructed and allowing unimpeded flow from the auger through the fan inlet and into the fan.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 7 is an exploded perspective view of the auger assembly of the embodiment of FIG. 1;

FIG. 8 is a schematic sectional front view of the embodiment of FIG. 1;

DETAILED DESCRIPTION OF THE ILLUSTRATED EMBODIMENTS

Figure 1:
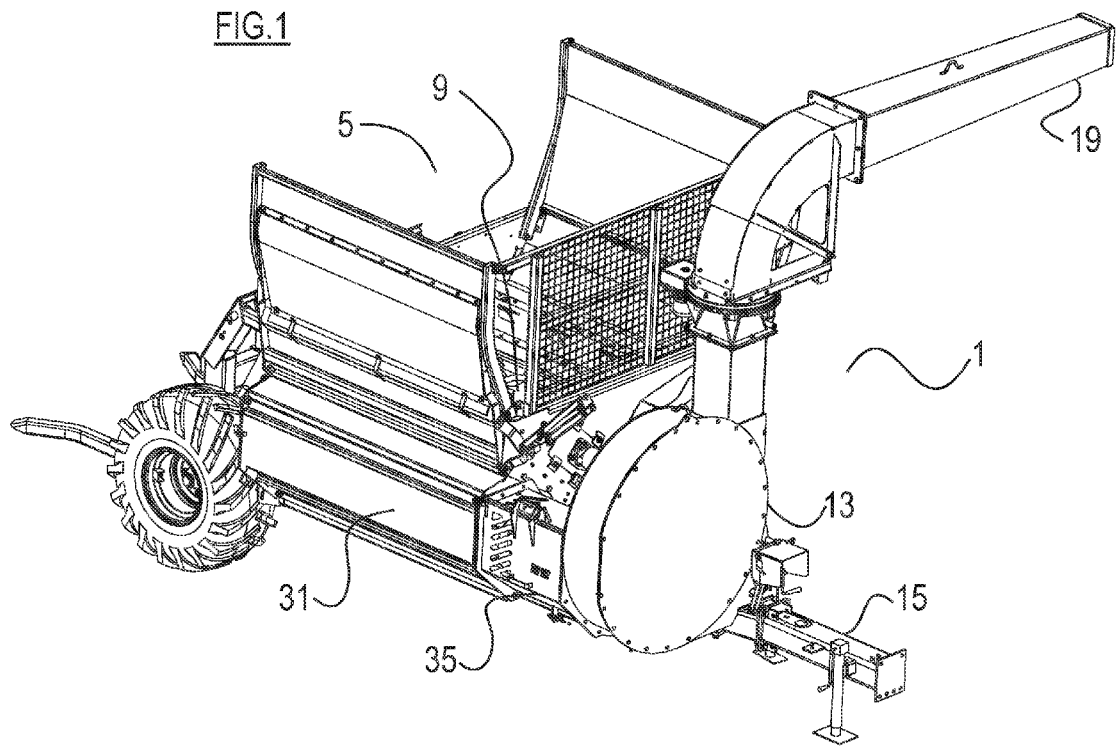
FIG. 1 is an upper perspective view of an embodiment of a bale processor apparatus of the present disclosure, with the side door closed and thus configured for fan discharge through the elevated discharge chute.
Figure 2:
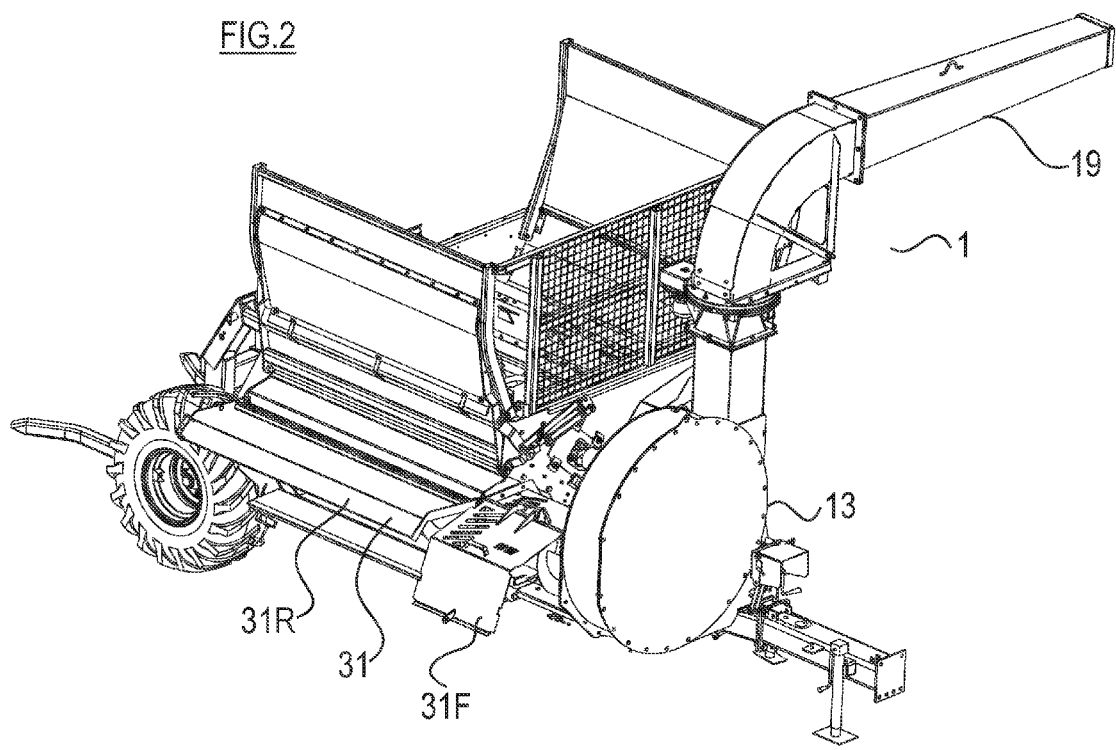
FIG. 2 is an upper perspective view of the embodiment of FIG. 1 with the side door open and thus configured for discharge through the side opening.
Figure 3:
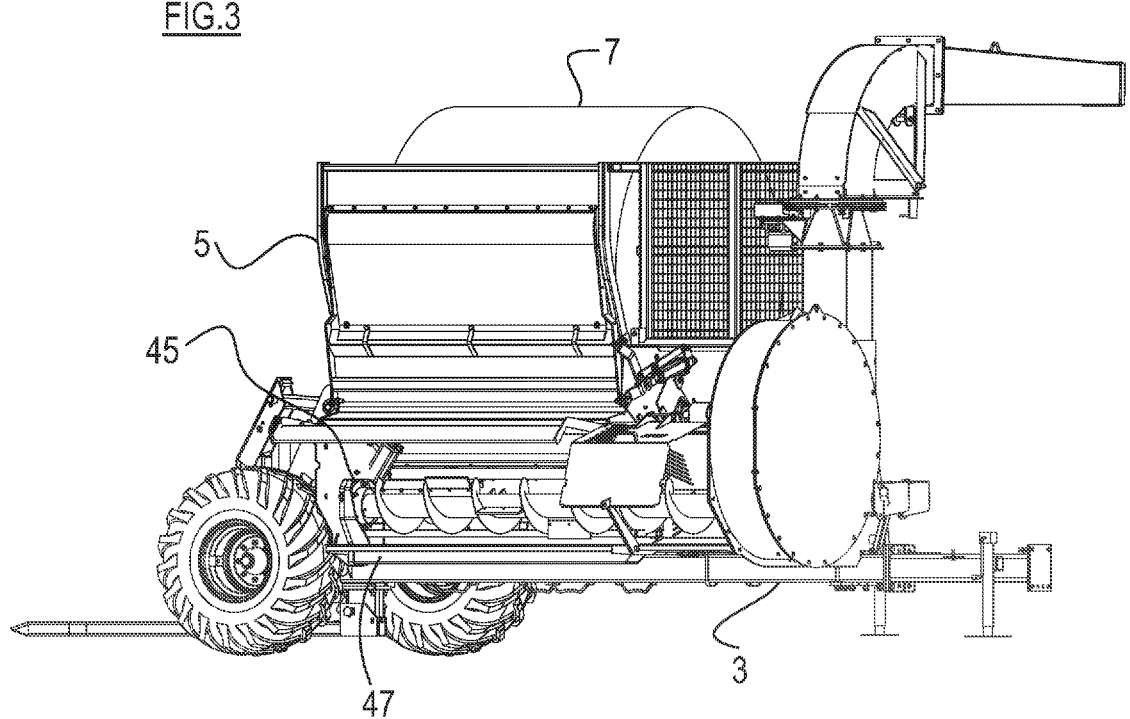
FIG. 3 is a perspective side front view of the embodiment of FIG. 1 with the side door open and thus configured for discharge through the side opening.
Figure 4:
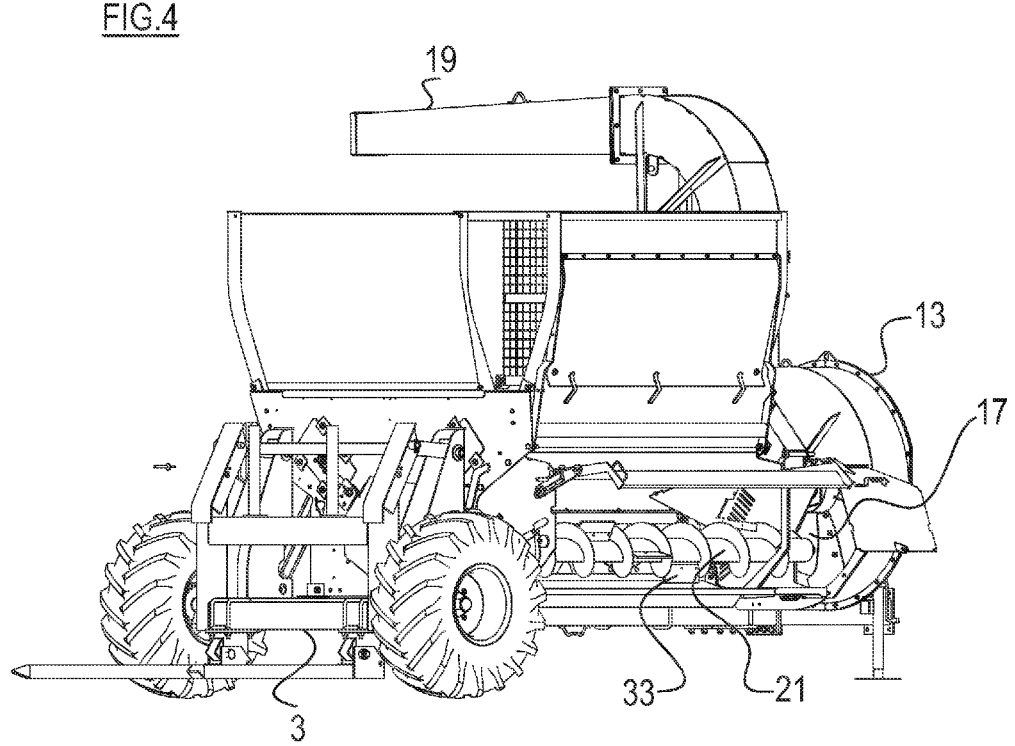
FIG. 4 is a perspective side rear view of the embodiment of FIG. 1 with the side door open and thus configured for discharge through the side opening.

FIGS. 1-4 illustrate an embodiment of a bale processor apparatus 1 of the present disclosure. The apparatus 1 comprises a frame 3 and a bale chamber 5 mounted on the frame 3 and configured to hold a bale 7. A disintegrator 9 adjacent to the bale chamber 5 is operative to remove shredded material 11 from the bale 9 and discharge the shredded material 11 laterally.

Figure 5:
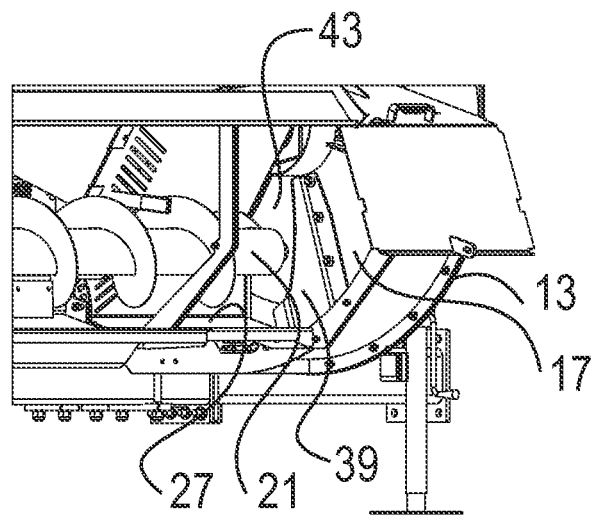
FIG. 5 is a close-up perspective side rear view of the front of the auger of the embodiment of FIG. 1.
Figure 6:
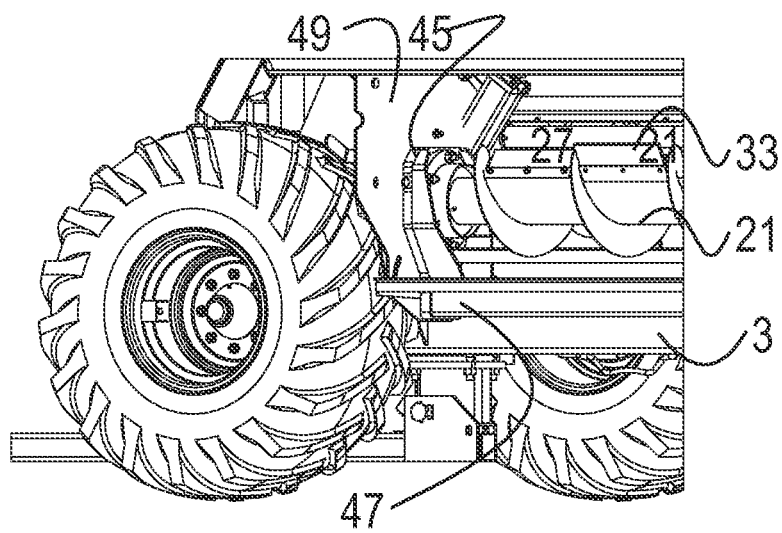
FIG. 6 is a close-up perspective side front view of the rear of the auger of the embodiment of FIG. 1.

A fan 13, located in the illustrated apparatus 1 at the front end near the hitch 15, is operative to receive the shredded material 11 through a fan inlet 17 and blow the shredded material out through a fan discharge 19. FIGS. 5 and 6 are close-up views of the mounted and discharge ends of the auger 21, and FIG. 7 is an exploded view of the construction of the auger 21. A schematic sectional view of the apparatus 1 looking rearward from a mid-point of the bale chamber 5 is shown in FIG. 8 to more clearly show the operation of the apparatus 1.

A conveyor, illustrated as an auger 21 extends along a side of the disintegrator 9 and is operative to receive the shredded material 11 from the disintegrator 9 along the inner side 21A thereof. The auger 21 has helical flighting 23 extending from an auger tube 25, and an auger floor 27 under the auger 21.

A side opening 29 extends along the outer side 21B of the auger 21 and a side door 31 covers the side opening 29. The side door 31 is movable from a closed position, illustrated in FIG. 1, where the auger 21 is substantially enclosed and the auger 21 moves the shredded material 11 along the auger and into the fan inlet 17, to an open position, illustrated in FIGS. 2-4 where the outer side 21B of the auger 21 is open and the auger 21 moves the shredded material laterally out through the side opening 29.

The auger 21 has a plurality of paddles 33 extending from out from the auger tube 25 between flights 23 of the auger. When the side door 31 is open shredded material 11 received from the disintegrator 9 is pushed out the side opening 29 by the paddles. Typically the fan 13 will be stopped as well, and the shredded material 11 has nowhere to go but out the side opening, forming a windrow on the ground.

When the side door 31 is closed, the fan 13 will be operating and shredded material 11 received from the disintegrator 9 cannot move out the side opening 29, and so moves along the auger 21 and into the fan inlet 17. The paddles 33 are aligned with the rotational axis RA of the auger 21.

Figure 9:
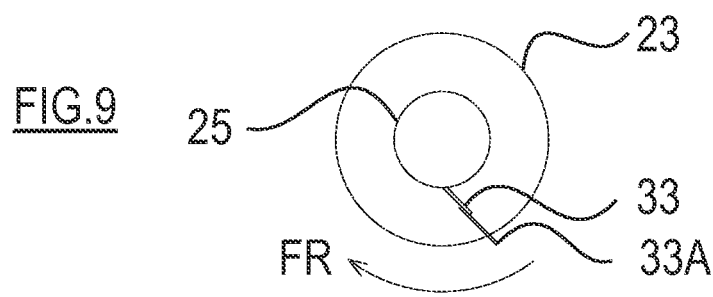
FIG. 9 is a schematic sectional front view of the auger of the embodiment of FIG. 1, showing a rearward sloping paddle.

In the illustrated apparatus 1, the paddles 33 comprise a paddle plate with a base edge welded to the auger tube 25 and aligned with the rotational axis RA of the auger, and a stiff rubber flap 37, such as belting, bolted to the paddle plate. The auger 21 rotates in a forward direction FR such that paddles 33 on a bottom side of the auger 21 move outward, and the faces of the paddles 33 slope in a rearward trailing direction from a base edge at the auger tube 25, to the outer edges 33A thereof, as schematically illustrated in FIG. 9. The outer edges 33A of the paddles 33 extend beyond an outer edge of the flights 23 such that same are close to the auger floor 27 as the auger 21 rotates.

The illustrated arrangement of paddles 33 facilitates pushing the shredded material 11 out the side opening 29 when the side door 31 is open. The rearward trailing sloping face allows the shredded material to drop off the face when it reaches the end of the auger floor 27 at the side opening, and the outer edges 33A of the paddles 33 sweep close to the floor 27 such that shredded material does not remain on the floor.

Also in the illustrated apparatus 1 the fan inlet 17 is located forward of the disintegrator 9, which is the same length as the bale chamber 5 and so the auger 21 extends through a transfer chamber 35 between the fan inlet 17 and the end of the disintegrator 9 and bale chamber 5. The side door 31 therefore comprises a rear disintegrator door portion 31R extending substantially along a length of the disintegrator 9 and bale chamber 5, and a front chamber door portion 31F along a length of the transfer chamber 35. With both door portions 31R, 31F open as in FIG. 2, the entire length of the outer side 21B of the auger 21 is open and shredded material 11 is readily pushed out the side opening 29 into a windrow.

Typically the auger 21 would be supported on a bearing at the discharge end adjacent to the fan inlet 17. The bearing is mounted on a post or the like, and this typical arrangement obstructs the delivery of shredded material 11 from the auger to the fan inlet 17 and limits capacity. In the illustrated apparatus 1, there is no bearing at the discharge end and the auger is rotatably attached to the frame 3 only at the mounted end thereof opposite the fan inlet 17 such that the auger 21 is cantilevered above the auger floor and the discharge end of the auger 21 at the fan inlet 17 is suspended above the auger floor 27, and shredded material moves readily from the auger 21 through the fan inlet 17 to the fan 13.

Figure 10:
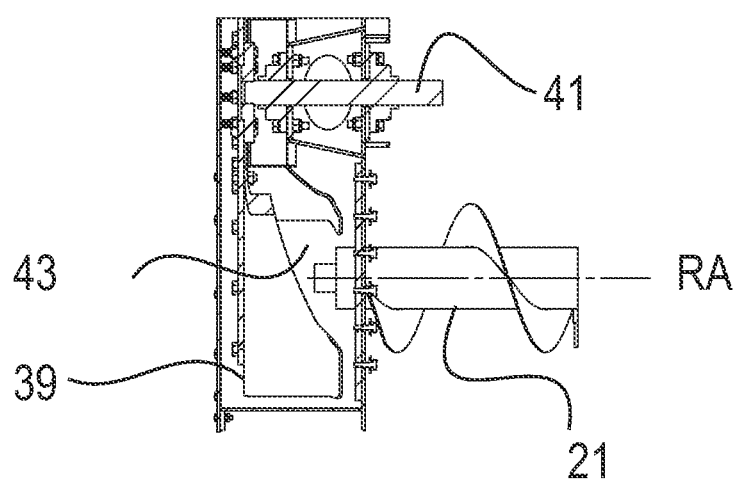
FIG. 10 is a schematic cut-away side view showing the structure of the fan and discharge end of the auger of the embodiment of FIG. 1.

As schematically illustrated in FIG. 10, the fan comprises fan blades 39 mounted to a fan shaft 41 oriented substantially parallel to the rotational axis RA of the auger. To further enhance capacity, each of the fan blades 39 defines a recess 43 between an outer end thereof and the fan shaft 41, and the discharge end of the auger 21 extends somewhat into the recesses 43 when the fan turns.

The assembly of the auger 21 is illustrated in FIG. 7. To accomplish the cantilevered auger 21, a base 45 is fixed to the frame 3 at the mounted end of the auger 21, as seen in FIG. 6. A reinforcing member 47 is fixed to the frame 3 and to the rear wall of the auger housing 49 to strengthen the structure to support the base 45. A support tube 51 is fixed to the base 45 and extends from a base end thereof near the base 45 to a discharge end thereof adjacent to the fan inlet. A drive shaft 53 extends through the support tube 51 with a base end of the drive shaft 53 mounted in a bearing 55 at the base end of the support tube 51, and a discharge end of the drive shaft 53 mounted in a bearing 57 at the discharge end of the support tube 51. A drive, such as a hydraulic motor 59, is connected to the base end of the drive shaft 53 and is operative to rotate the drive shaft 53. The support tube 51 extends through the auger tube 25 such that the rotational axis of the auger RA coincides with the drive shaft 53. The auger tube 25 is rotatably supported at a mounted end thereof on the support tube 51 with a bearing or bushing 61, and is fixed at a discharge end thereof to the discharge end of the drive shaft 53 with a lock collar 63 or the like such that the auger 21 rotates with the drive shaft 53.

The present disclosure provides a bale processor apparatus 1 with a simple and economic mechanism for converting from discharging through the fan discharge 19 to spread the shredded material 11, or discharging through the side opening 29 to drop the shredded material 11 into a windrow. Mounting the auger 21 on a cantilever as described keeps the fan inlet 17 unobstructed and increases capacity as flow from the auger 21 through the fan inlet 17 is unimpeded.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A bale processor apparatus comprising:
   a frame and a bale chamber mounted on the frame and configured to hold a bale;
   a disintegrator adjacent to the bale chamber and operative to shred material from the bale and discharge shredded material laterally;
   a fan operative to receive the shredded material through a fan inlet and blow the shredded material out through a fan discharge;
   a conveyor extending along a side of the disintegrator and operative to receive the shredded material from the disintegrator along an inner side of the conveyor;
   a side opening extending along substantially a length of the bale chamber along an outer side of the conveyor and a side door covering the side opening;
   wherein the side door is movable from a closed position, where the conveyor is enclosed and the conveyor is configured to move the shredded material along the conveyor and into the fan inlet at a first end of the conveyor, to an open position where the outer side of the conveyor is open and the conveyor is further configured to discharge the shredded material laterally out through the side opening along a length of the conveyor from the first end of the conveyor to an opposite second end of the conveyor.

2. The apparatus of claim 1 wherein the conveyor comprises an auger with helical fighting extending from an auger tube, and an auger floor under the auger, and comprising a plurality of paddles extending out from the auger tube between flights of the auger, the paddles substantially aligned with a rotational axis of the auger.

3. The apparatus of claim 2 wherein the auger rotates in a forward direction such that paddles on a bottom side of the auger move outward.

4. The apparatus of claim 3 wherein a face of at least one paddle slopes in a rearward trailing direction from a base edge at the auger tube, the base edge substantially aligned with the rotational axis of the auger, to an outer edge thereof.

5. The apparatus of claim 4 wherein the outer edge of the at least one paddle extends beyond an outer edge of the flights.

6. The apparatus of claim 2 wherein the fan inlet is located forward of the disintegrator, and wherein the auger extends through a transfer chamber between the fan inlet and an end of the disintegrator, and wherein the side door comprises a disintegrator door portion extending substantially along a length of the disintegrator, and a chamber door portion along a length of the transfer chamber.

7. The apparatus of claim 2 wherein the auger is rotatably attached to the frame only at a mounted end thereof opposite the fan inlet such that a discharge end of the auger at the fan inlet is suspended above the auger floor.

8. The apparatus of claim 7 comprising:
   a base fixed to the frame at the mounted end of the auger;
   a support tube fixed to the base and extending from a base end thereof near the base to a discharge end thereof adjacent to the fan inlet;
   a drive shaft extending through the support tube, a base end of the drive shaft mounted in a bearing at the base end of the support tube, and a discharge end of the drive shaft mounted in a bearing at the discharge end of the support tube;
   a drive connected to the base end of the drive shaft and operative to rotate the drive shaft;
   wherein the support tube extends through the auger tube such that the rotational axis of the auger coincides with the drive shaft, and wherein the auger tube is rotatably supported at a mounted end thereof on the support tube, and is fixed at a discharge end thereof to the discharge end of the drive shaft.

9. The apparatus of claim 8 wherein the fan comprises fan blades mounted to a fan shaft oriented substantially parallel to the rotational axis of the auger, and each of the fan blades defines a recess between an outer end thereof and the fan shaft, and wherein the discharge end of the auger extends into the recesses when the fan turns.

* * * * *